INVENTOR:
JAMES R. HARNISH,
BY Robert J. Palmer
ATTORNEY

United States Patent Office 3,388,558
Patented June 18, 1968

3,388,558
REFRIGERATION SYSTEMS EMPLOYING
SUBCOOLING CONTROL MEANS
James R. Harnish, Staunton, Va., assignor to Westinghouse Electric Corporation, Pittsburgh, Pa., a corporation of Pennsylvania
Filed July 28, 1966, Ser. No. 568,438
4 Claims. (Cl. 62—196)

ABSTRACT OF THE DISCLOSURE

A refrigeration system has an expansion valve responsive through a thermal bulb to the temperature of the refrigerant liquid, and responsive to the pressure of the refrigerant liquid. An increase in the temperature of the liquid without a corresponding increase in its pressure causes the valve to adjust towards closed position, and a decrease in the temperature of the liquid without a corresponding decrease in its pressure causes the valve to adjust towards open position. A heater is provided for the thermal bulb, and when energized, acts to close the valve. Refrigerant from the system supplied in heat exchange contact with the thermal bulb acts to open the valve.

---

This invention relates to refrigeration systems using subcooling control valves as expansion valves.

As disclosed in my copending application, Ser. No. 447,008, filed Apr. 9, 1965, now Patent No. 3,264,837, subcooling control valves used as expansion valves in refrigeration systems have many advantages over thermal expansion valves. Among such advantages are that they supply refrigerant liquid to evaporators at the rate at which it is condensed within associated condensers while maintaining a predetermined amount of subcooling of such liquid. Such a subcooling control valve is responsive to the temperature and the pressure of the refrigerant liquid leaving an associated condenser. An increase in the temperature of the liquid tends to close the valve, and an increase in the pressure of the liquid tends to open the valve.

This invention provides auxiliary means for closing and opening a subcooling control valve so as to enable it to perform other functions. For example, a subcooling control valve can be closed to starve an associated evaporator for the purpose of air dehumidification as disclosed in my copending application, Ser. No. 549,122 filed Apr. 19, 1966; now Patent No. 3,324,671, can be closed to starve an evaporator at high ambient temperatures to prevent the overloading of a compressor motor or the tripping of a high pressure cut-out; can be closed to provide a positive liquid shut-off when a compressor is shut-down, and can be opened to prevent an evaporator from becoming starved when the condensing pressure is insufficient to open the valve sufficiently.

An object of this invention is to provide auxiliary means for closing a subcooling control valve.

Another object of this invention is to provide auxiliary means for opening a subcooling control valve.

Figure 1:
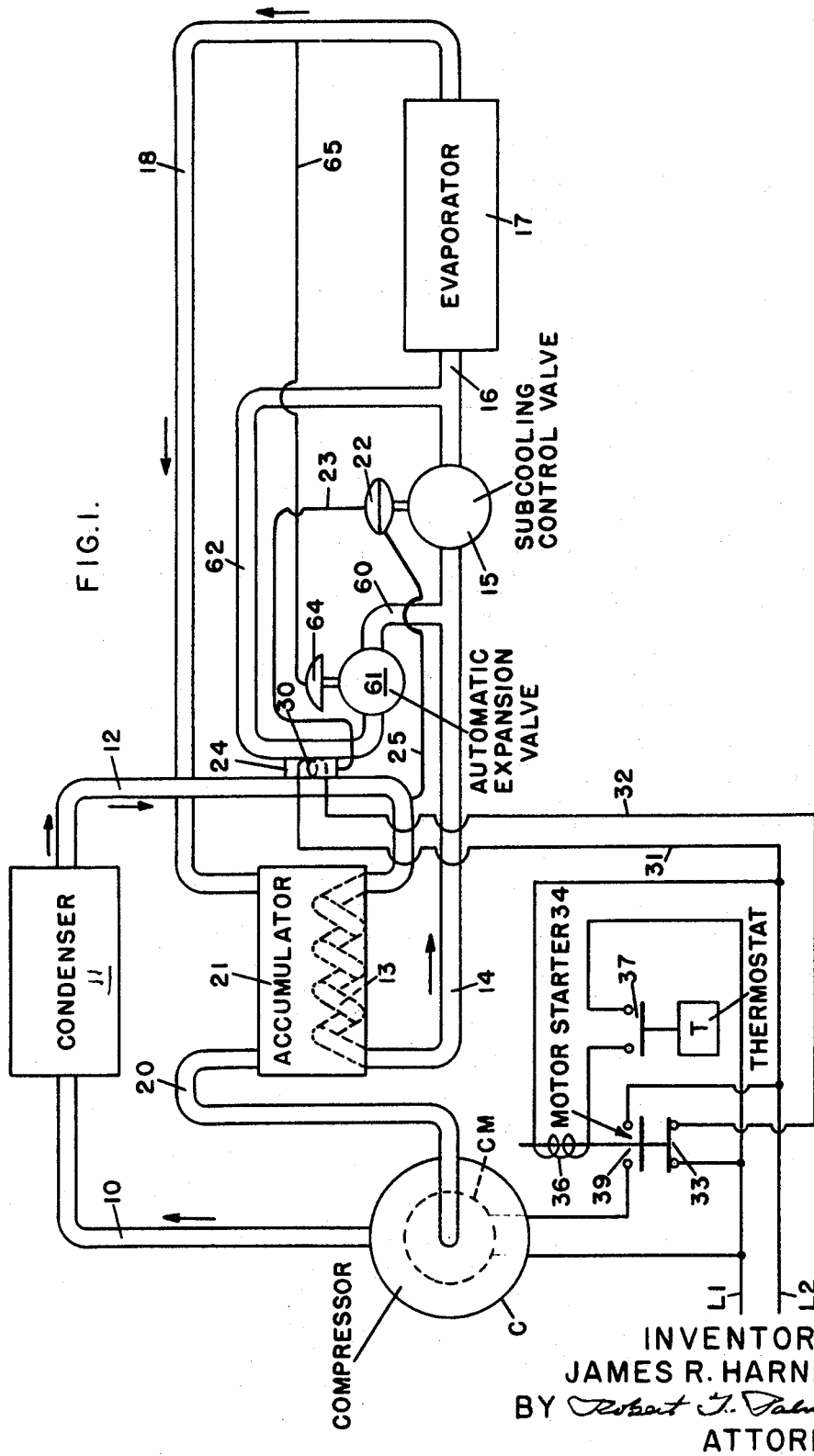
FIG. 1 is a diagrammatic view of a refrigeration system embodying this invention.

This invention will now be described with reference to the annexed drawings, of which:

Description of FIG. 1

A conventional, hermetic refrigerant compressor C, having an enclosed electric driving motor CM, is connected by discharge gas tube 10 to condenser 11 which is connected by liquid tube 12 to heat exchange coil 13 within accumulator 21. The coil 13 is connected by tube 14 to subcooling control valve 15 which is connected by tube 16 to evaporator 17. The evaporator 17 is connected by tube 18 to the upper portion of the accumulator 21 at one end of the latter. The upper portion of the accumulator 21 at its other end is connected by suction gas tube 20 to the suction side of the compressor C. The tube 14 is also connected by tube 60 to the inlet of a conventional automatic expansion valve 61, the details of which are shown in my previously mentioned application, Ser. No. 447,008. The outlet of the valve 61 is connected by tube 62 to the tube 16. A portion of the tube 62 is in heat exchange contact with thermal bulb 24 which is in heat exchange contact with the liquid tube 12. The automatic expansion valve 61 has a diaphragm chamber 64 connected by equalizer tube 65 to the tube 18, and responds to the pressure of the refrigerant leaving the evaporator 17.

Figure 2:
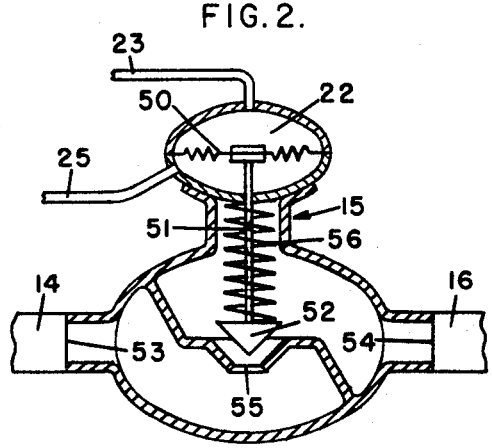
FIG. 2 is an enlarged sectional view of the subcooling control valve of FIG. 1.

The subcooling control valve 15, the details of which are shown by FIG. 2, has a diaphragm chamber 22, the upper portion of which is connected by capillary tube 23 to the bulb 24. The lower portion of the diaphragm chamber 22 is connected by capillary tube 25 to the interior of the tube 12. An electric heater 30 is wrapped around or imbedded in the bulb 24, and is connected by wire 31 to electric supply line L2, and by wire 32 to switch 33 of starter 34 of the motor CM. The switch 33 is connected to electric supply line L1. The starter 34 has an energizing coil 36 connected in series with switch 37 of thermostat T to the lines L1 and L2. The starter 34 has another switch 39 connected in series with the motor CM to the lines L1 and L2.

Description of FIG. 2

The diaphragm chamber 22 of the subcooling control valve 15 has a diaphragm 50 extending across its center. The diaphragm 50 is connected at its center to one end of piston rod 51 which has a valve piston 52 on its other end. The valve 15 has a valve body with an inlet 53 and an outlet 54. A partition 55 extends between the inlet 53 and the outlet 54, and has a valve opening 55 aligned with the piston 52. A coiled spring 56 extends around the rod 51 between the top of the piston 52 and the bottom of the chamber 22, and biases the piston 52 towards closed position.

The thermal bulb 24 contains the same refrigerant as is used in the system. An increase in its temperature caused by an increase in the temperature of the liquid flowing through the tube 12, causes the refrigerant within the bulb 24 to flow through the tube 23 against the top of the diaphragm 50, moving the piston 52 towards closed position. An increase in the pressure in the liquid flowing through the tube 12, causes an increase in the pressure against the bottom of the diaphragm 50, moving the piston 52 towards open position. The above described operation is normal operation with the heater 30 deenergized.

Operation of FIG. 1

When the thermostat T which may be responsive to the temperature of indoor air when the evaporator 17 is an air cooling evaporator coil, opens its switch 37, the motor starter 34 is deenergized and closes its switch 33, and opens its switch 39. The closed switch 33 energizes the electric heater 30 of the thermal bulb 24, causing through the increased temperature of the latter, an increase in the pressure against the top of the diaphragm 50 (FIG. 2) to cause the latter to close the valve 15, preventing the flow of refrigerant within the system. The open switch 39 deenergizes the compressor motor CM, stopping the compressor C.

When the thermostat T calls for cooling, it closes its switch 37, energizing the motor starter 34 which opens its switch 33, and closes its switch 39. The open switch 33 deenergizes the electric heater 30 of the thermal bulb 24, permitting the subcooling control valve 15 to open. The closed switch 39 energizes the compressor motor CM, starting the compressor C. The compressor C supplies discharge gas through the tube 10 into the condenser 11. Refrigerant liquid flows from the condenser 11 through the tube 12, the coil 13 and the tube 14 into the subcooling control valve 15 operating as an expansion valve. Refrigerant flows from the valve 15 through the tube 16 into the evaporator 17. Gas and unevaporated refrigerant liquid flow from the evaporator 17 through the tube 18 into the accumulator 21. Gas separated from the liquid within the accumulator 21, flows through the tube 20 to the suction side of the compressor C.

The subcooling control valve 15, as described in my previously mentioned application, Ser. No. 447,008, delivers refrigerant to the evaporator 17 at the rate at which the refrigerant is condensed within the condenser 11, while maintaining a predetermined amount of subcooling, which may be 10° F. subcooling at a condensing temperature of 100° F., of the condensed refrigerant. The evaporator 17 is overfed so that unevaporated refrigerant liquid flows from it into the accumulator 21 where the unevaporated liquid is evaporated by heat from the high pressure liquid flowing through the coil 13, the high pressure liquid being further subcooled by this action.

When the condenser 11 is a coil cooled by outdoor air, at low outdoor ambient temperatures, the condensing pressure may be so reduced that the pressure of the liquid from the condenser 11 may be insufficient to cause the valve 15 to open sufficiently to prevent the evaporator 17 from becoming starved. When this happens, the resulting reduced pressure of the refrigerant leaving the evaporator 17, causes the automatic expansion valve 61 to open and expand refrigerant into the tube 62, cooling the thermal bulb 24 and reducing the pressure against the top of the diaphragm 50 of the valve 15, thereby causing the valve 15 to open further to supply more refrigerant to the evaporator 17. A one-ton automatic expansion valve can so adjust a hundred-ton subcooling control valve.

Figure 3:
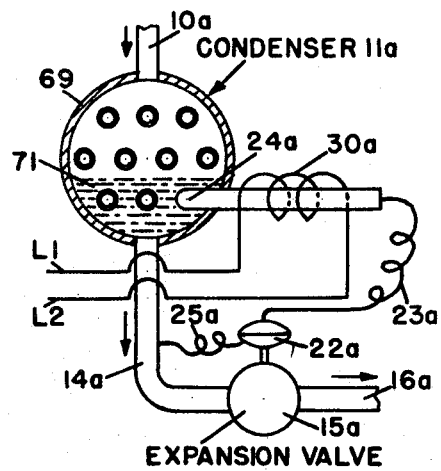
FIG. 3 is a fragmentary diagrammatic view of another refrigeration system embodying this invention.

Description of FIG. 3

In the embodiment of FIG. 3, a valve 15a similar to the valve 15 described in the foregoing, but not operating to subcool refrigerant liquid, operates to maintain a desired liquid level within a shell-and-tube condenser 11a. The condenser 11a has a shell 69 containing tubes 70 for cooling and condensing refrigerant gas entering the condenser through the discharge gas tube 10a. A thermal bulb 24a has an inner portion extending into refrigerant liquid 71 accumulated in the bottom portion of the shell, and has an outer portion around which an electric heater 30a is wound. The valve 15a is connected in a liquid tube 14a connecting the condenser 11a to an evaporator which is not shown. The valve 15a has a diaphragm chamber 22a connected in its upper portion by capillary tube 23a to the bulb 24a, and connected in its lower portion through capillary equalizer tube 25a to the interior of the tube 14a, although it could be internally equalized. The heater 30a is connected to electric supply lines L1 and L2.

Operation of FIG. 3

When refrigerant liquid is in contact with the inner portion of the bulb 24a, the heat added by the heater 30a to the bulb is dissipated into the liquid so that the bulb 24a remains sufficiently cool to permit the valve 15a to be open. When the level of the liquid decreases until it is no longer in contact with the inner portion of the bulb, the latter is heated sufficiently by the heater to cause the valve 15a to be adjusted towards closed position, decreasing the amount of refrigerant supplied to the associated evaporator until the liquid level increases sufficiently to contact the inner portion of the bulb 24a.

Figure 4:
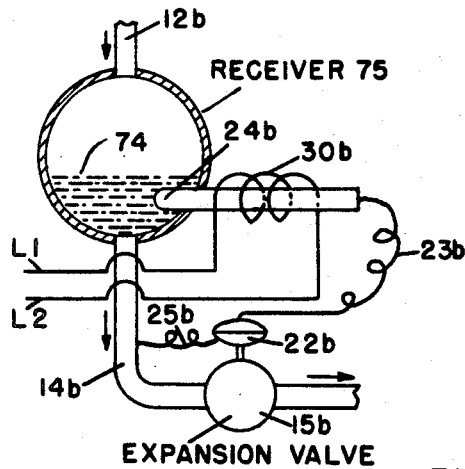
FIG. 4 is a fragmentary diagrammatic view of another refrigeration system embodying this invention.

Description of FIG. 4

In the embodiment of FIG. 4, a valve 15b similar to the valve 15 described in the foregoing in connection with FIGS. 1–2, but not operating to subcool refrigerant liquid, operates to maintain a desired liquid level within a high pressure receiver 73. The receiver 73 is connected in liquid tube 12b between an associated condenser which is not shown, and the valve 15b, the latter being connected to an associated evaporator which is not shown. A thermal bulb 24b has an inner portion extending into refrigerant liquid 74 accumulated in the bottom portion of the receiver 73, and has an outer portion around which an electric heater 30b is wound. The valve 15b has a diaphragm chamber 22b, the upper portion of which is connected by capillary tube 23b to the bulb 24b, and the lower portion of which is connected by capillary equalizer tube 25b to the interior of the tube 12b although it could be internally equalized. The heater 30b is connected to electric supply lines L1 and L2.

Operation of FIG. 4

When refrigerant liquid is in contact with the inner portion of the bulb 24b, the heat added by the heater 30b to the bulb is dissipated into the liquid so that the bulb 24b remains sufficiently cool to permit the valve 15b to be open. When the level of the liquid decreases until it is no longer in contact with the inner portion of the bulb, the latter is heated sufficiently by the heater to cause the valve 15b to be adjusted towards closed position, decreasing the amount of refrigerant supplied to the associated evaporator until the liquid level increases sufficiently to contact the inner portion of the bulb.

Figure 5:
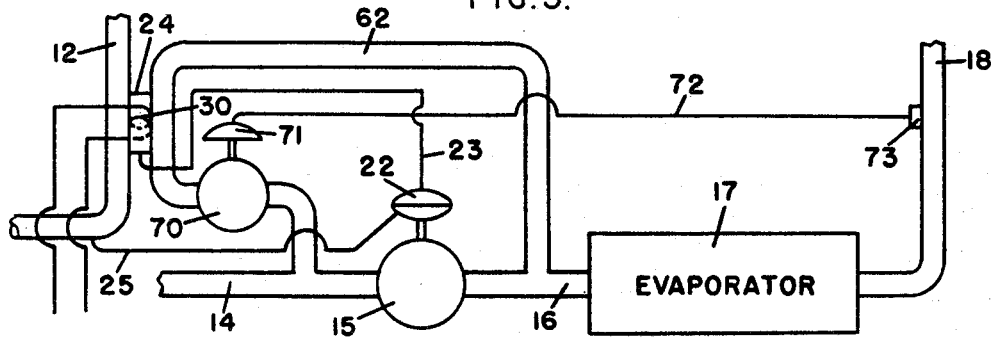
FIG. 5 is a fragmentary diagrammatic view of a modification of FIG. 1.

Description of FIG. 5

FIG. 5 is similar to FIG. 1 except that the automatic expansion valve 61 of FIG. 1, and its equalizer tube 65 are omitted from FIG. 5, and a normally closed, conventional thermal expansion valve 70 is substituted in FIG. 5 for the automatic expansion valve 61. The thermal valve 70 has a diaphragm chamber 71 connected by a capillary tube 72 to a thermal bulb 73 in heat exchange contact with the tube 18 connected to the outlet of the evaporator 17.

Operation of FIG. 5

The operation of FIG. 5 is the same as that of FIG. 1 except that when the condensing pressure is so reduced that the subcooling control valve 15 does not open sufficiently to prevent the evaporator 17 from becoming starved, the resulting increase in superheat in the refrigerant leaving the evaporator 17 causes the valve 70 to open, and to expand refrigerant into the tube 62, cooling the thermal bulb 24; and causing the valve 15 to open wider to supply more refrigerant to the evaporator 17.

What is claimed, is:

1. In a refrigeration system having an evaporator, and having refrigerant supply tubing connected to said evaporator, an expansion valve connected in said tubing, said valve having a thermal bulb, having means responsive to the temperature of said bulb, and responsive to the pressure of the refrigerant liquid flowing through said tubing to said valve, for adjusting said valve towards closed position on an increase in said temperature without a corresponding increase in said pressure, for adjusting said valve towards open position on a decrease in said temperature without a corresponding decrease in said pressure, for adjusting said valve towards closed position on a decrease in said pressure without a corresponding decrease in said temperature, and for adjusting said valve towards open position on an increase in said pressure without a corresponding increase in said temperature, an electric heater for said bulb, means for energizing said heater, and means using refrigerant from said system for cooling said bulb.

2. In a refrigeration system having a condenser, an evaporator, and having refrigerant liquid supply tubing for connecting said condenser to said evaporator, an expansion valve connected in said tubing, said valve having a thermal bulb responsive to the temperature of the refrigerant liquid flowing from said condenser into said tubing, having means responsive to the temperature of said bulb, and responsive to the pressure of the refrigerant liquid flowing through said tubing to said valve, for adjusting said valve towards closed position on an increase in said temperature without a corresponding increase in said pressure, for adjusting said valve towards open position on a decrease in said temperature without a corresponding decrease in said pressure, for adjusting said valve towards closed position on a decrease in said pressure without a corresponding decrease in said temperature, and for adjusting said valve towards open position on an increase in said pressure without a corresponding increase in said temperature, and means using expanded refrigerant from said system for cooling said bulb.

3. The invention claimed in claim 2 in which said means for cooling said bulb comprises a tube connected to said tubing on opposite sides of said expansion valve, and having a portion in heat exchange contact with said bulb, and in which an automatic expansion valve is connected in said tube between said portion and where said tube connects with said tubing at the inlet side of said first mentioned expansion valve.

4. The invention claimed in claim 2 in which said means for cooling said bulb comprises a tube connected to said tubing on opposite sides of said expansion valve, and having a portion in heat exchange contact with said bulb, and in which a thermal expansion valve is connected in said tube between said portion and where said tube connects with said tubing at the inlet side of said first mentioned expansion valve, in which said evaporator has a second tube connected to its refrigerant outlet, and in which a thermal bulb in heat exchange contact with said second tube is connected by a capillary tube to said thermal valve.

References Cited
UNITED STATES PATENTS

| | | | |
|---|---|---|---|
| 2,319,005 | 5/1943 | Lum | 62—202 |
| 3,316,730 | 5/1967 | Lauer | 62—196 |

MEYER PERLIN, *Primary Examiner.*